Dec. 15, 1970  B. E. LONERGAN  3,546,829
GROCERY BAGGING AND CART LOADING MACHINE AND METHOD
Filed Sept. 27, 1968  5 Sheets-Sheet 3
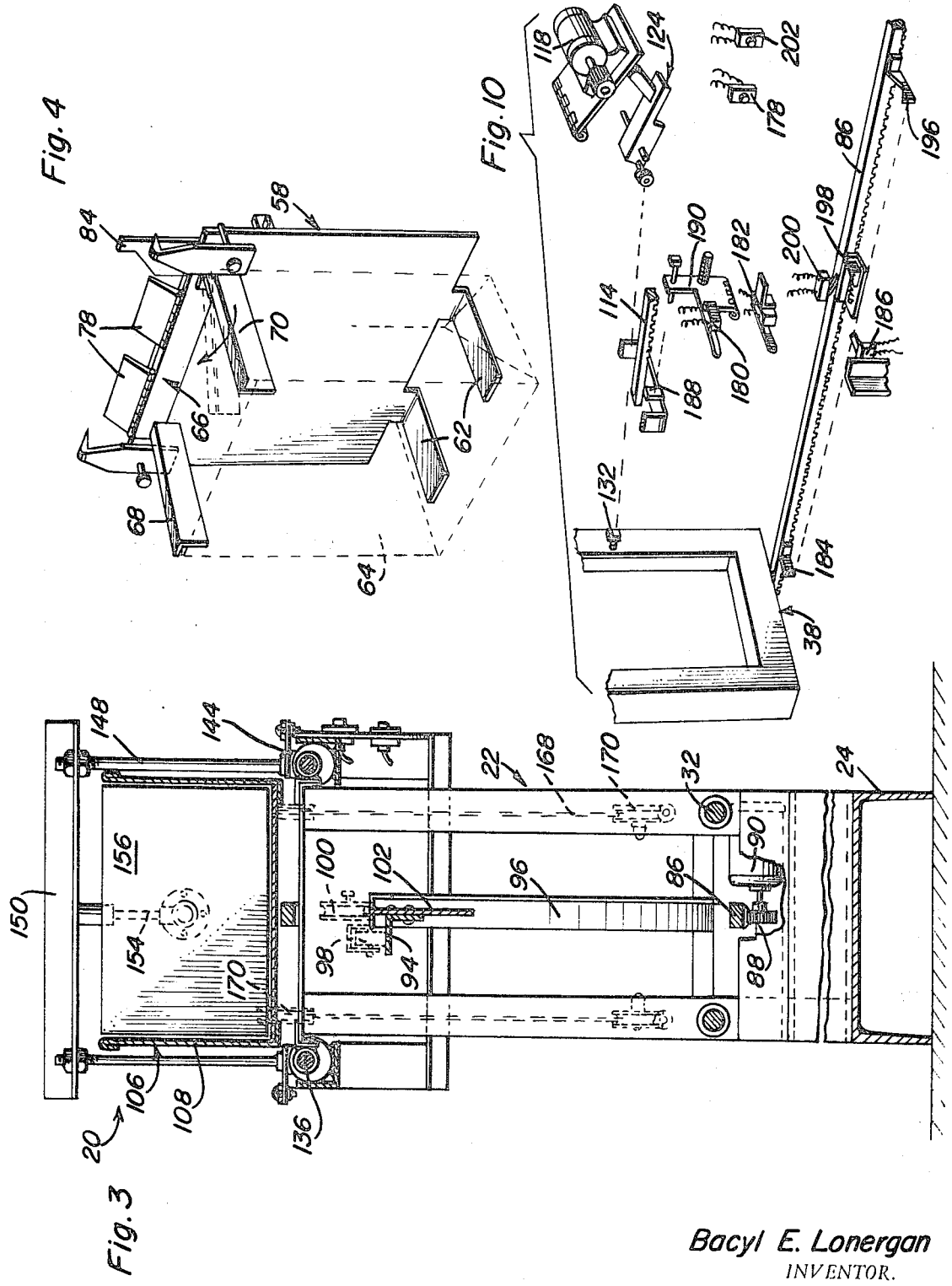
Bacyl E. Lonergan
INVENTOR.
BY Clarence A. O'Brien
and Harvey B. Jacobson
Attorneys

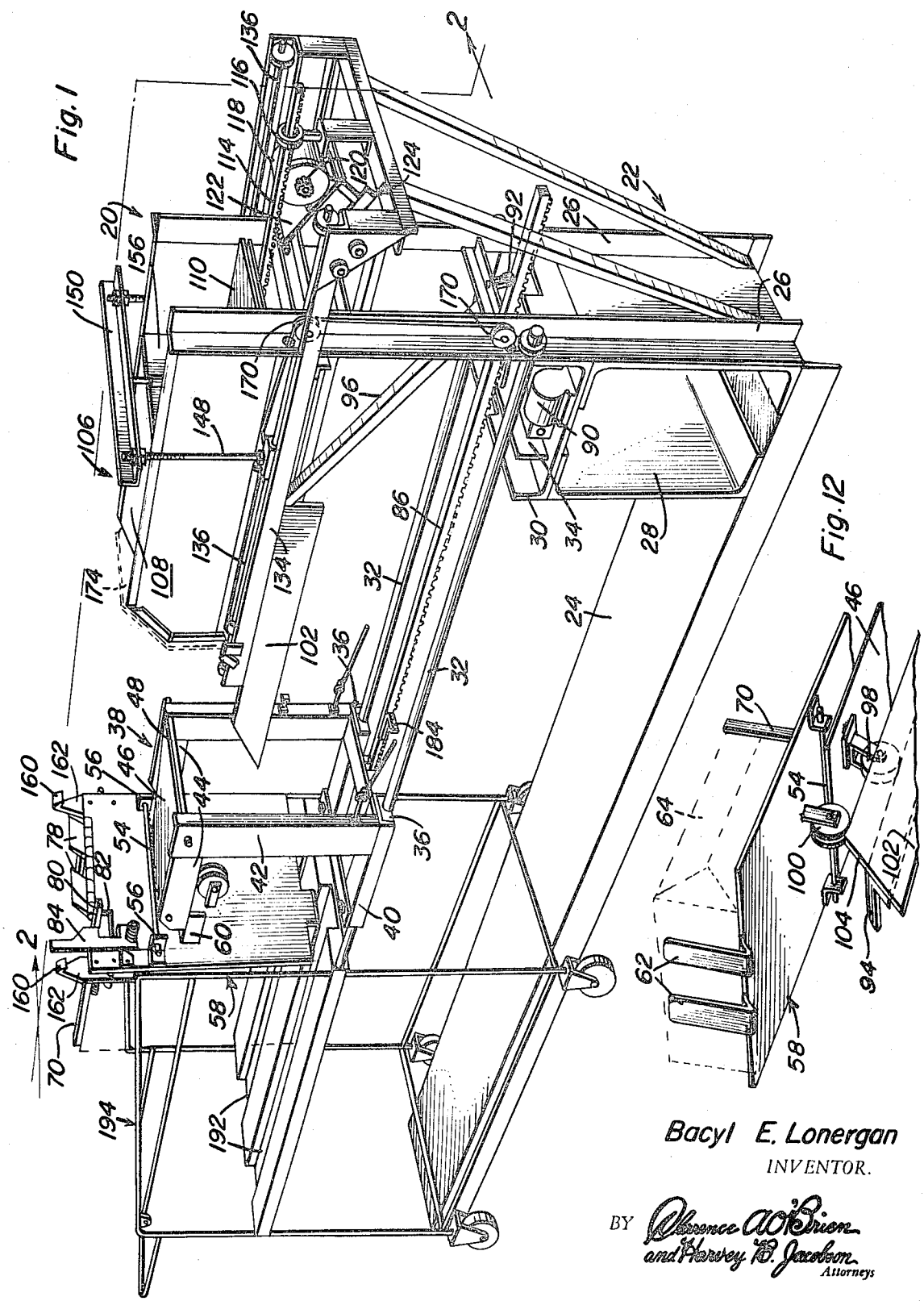

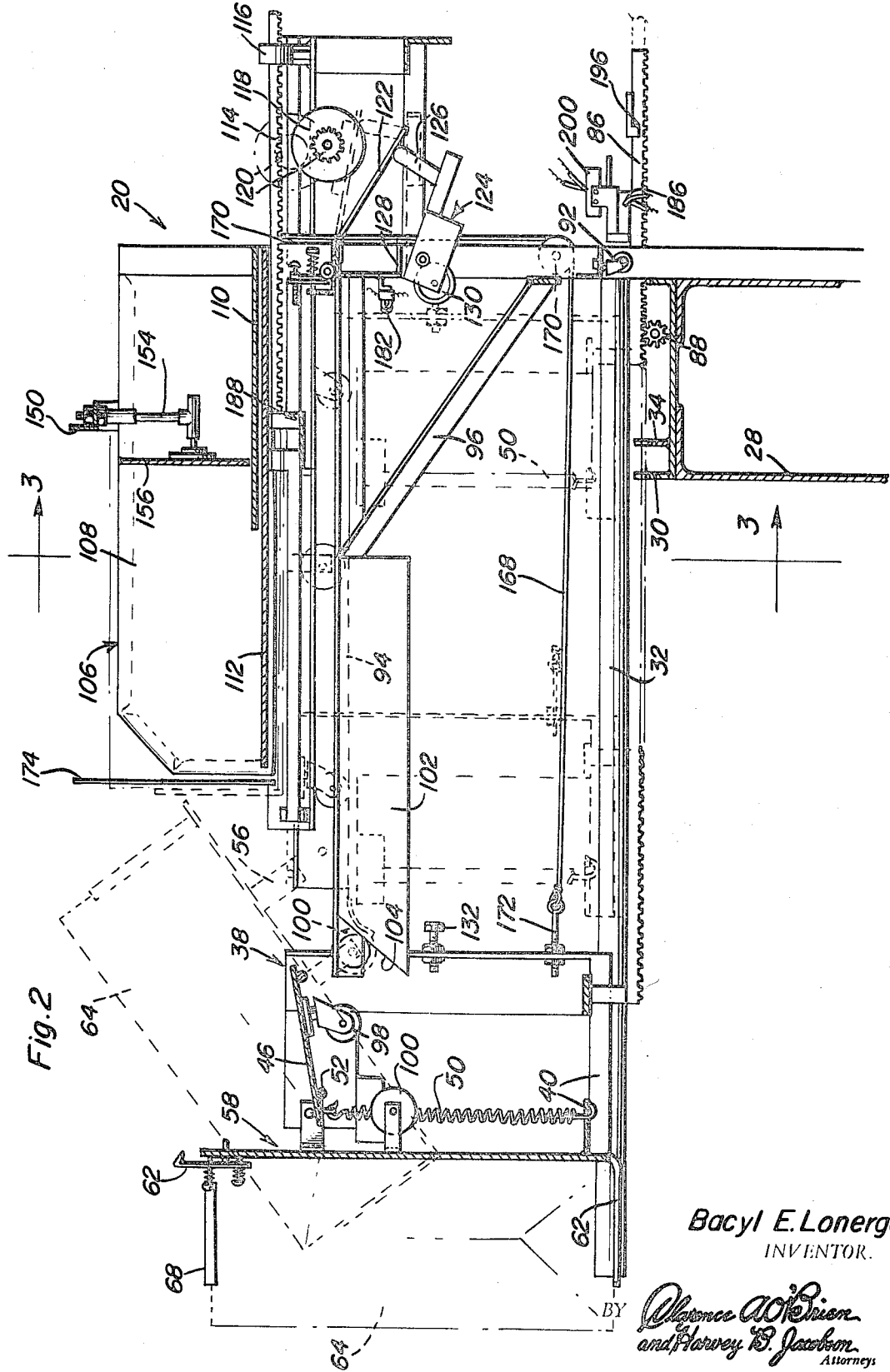

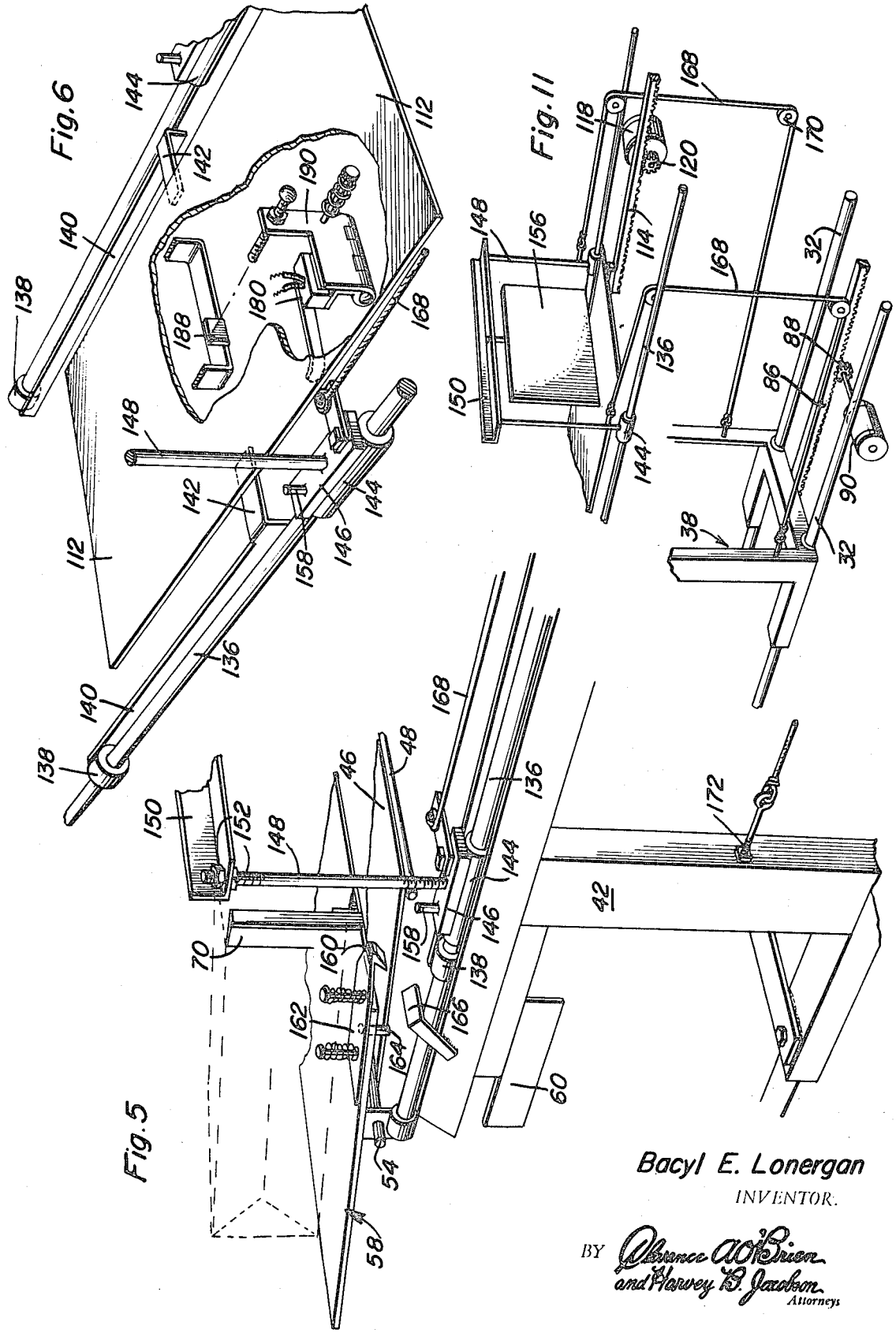

Dec. 15, 1970   B. E. LONERGAN   3,546,829
GROCERY BAGGING AND CART LOADING MACHINE AND METHOD
Filed Sept. 27, 1968   3 Sheets-Sheet 3
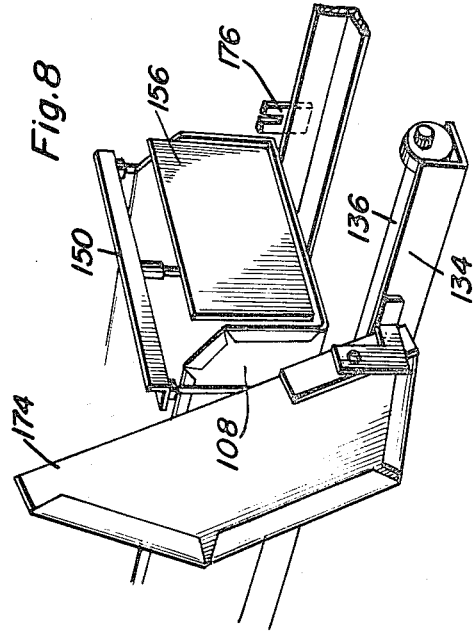
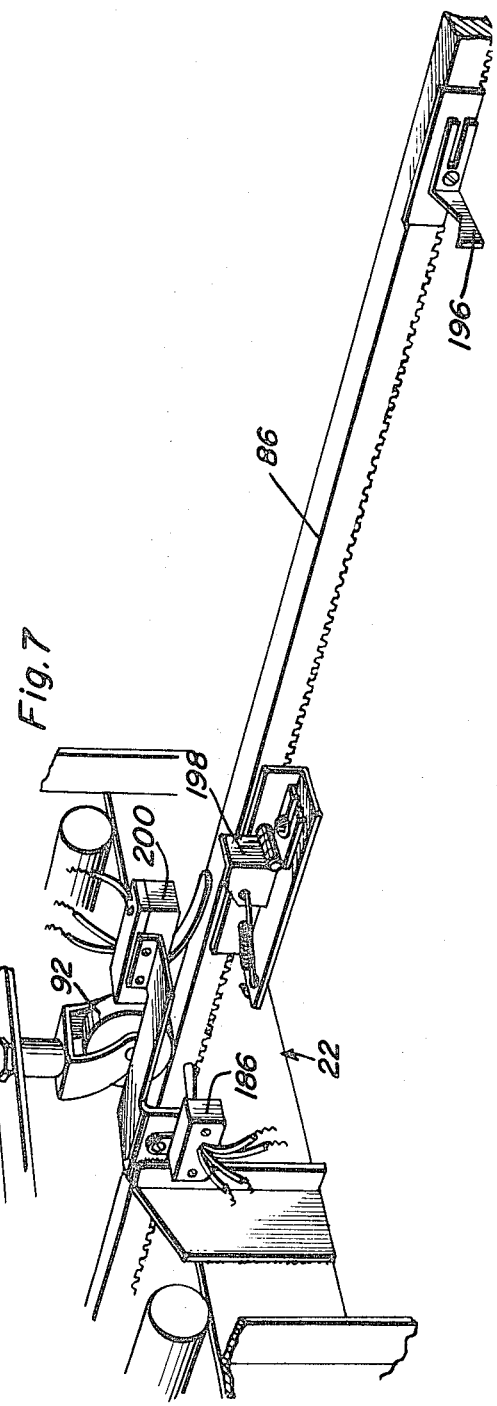
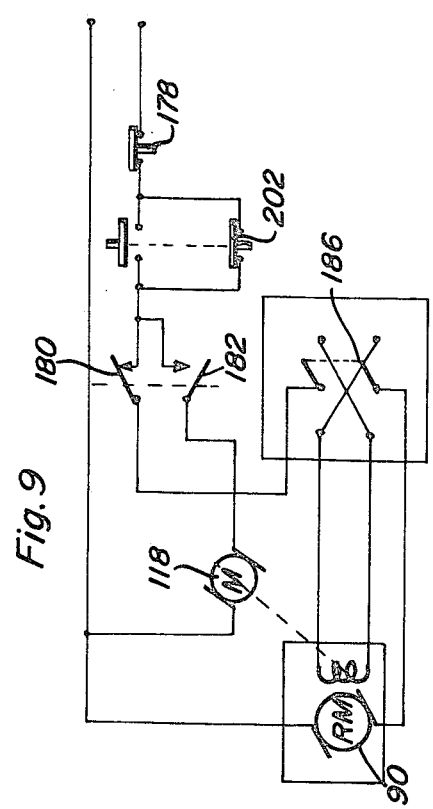
Bacyl E. Lonergan
INVENTOR.

United States Patent Office 3,546,829
Patented Dec. 15, 1970

3,546,829
GROCERY BAGGING AND CART LOADING MACHINE AND METHOD
Bacyl E. Lonergan, Lucedale, Miss., assignor to B & L Developers, Inc., a corporation of Louisiana
Filed Sept. 27, 1968, Ser. No. 763,087
Int. Cl. B65b 5/06, 67/04
U.S. Cl. 53—35                          24 Claims

ABSTRACT OF THE DISCLOSURE

A machine which, subsequent to the introduction of groceries or the like to be bagged, is activated so as to move a main carriage supported bag about the groceries. A releasable bottom temporarily supports the groceries and is retracted so as to transfer the groceries to the bag. A pusher plate retains the groceries in the bag as the bag is retracted. The main carriage includes a pair of positioning rollers which cooperate with frame mounted tracks whereby the bag is turned vertically and shifted downwardly for forward loading onto an appropriate cart after which the main carriage releases the bag and is automatically reset.

---

The present invention is concerned with the bagging of groceries, and more particularly relates to unique automatic means for transferring stacked groceries to bags and subsequently load the bags on grocery carts.

It is a significant object of the instant invention to provide such a loading machine which is uniquely adapted to be utilized at checkout counters, enabling the cashier to effect the actual bagging of the groceries with a minimum amount of effort and in a minimum amount of time, thereby avoiding the necessity of detailing personnel merely for the purpose of loading the groceries in bags.

Another significant object of the instant invention resides in the provision of a compact efficient unit which not only bags the groceries but discharges the bagged groceries remote from the machine, normally in a loading cart capable of receiving several bags for subsequent transport to a discharge point.

Basically, the machine of the instant invention includes a grocery container within which the groceries are stacked, a bag carrying and positioning carriage which receives the grocery bag and moves the bag into encompassing relationship with the grocery container, and various means for transferring the groceries from the container to the carriage mounted bag, including a retracting bottom and a pusher plate. Upon an introduction of the groceries from the container into the bag, the main carriage withdraws forwardly from the container and subsequently, through a pair of rollers and guide rails, vertically positions the bag for subsequent discharge onto an appropriate cart or the like after which the machine automatically repositions the carriage for the reception of another bag.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the grocery bagging machine and an associated cart particularly adapted for automatically receiving the loaded bags;

FIG. 2 is a longitudinal cross-sectional view taken through the machine substantially on a plane passing along line 2—2 in FIG. 1;

FIG. 3 is a transverse cross-sectional view taken substantially on a plane passing along line 3—3 in FIG. 2;

FIG. 4 is a perspective detail of the bag carrier;

FIG. 5 is an enlarged perspective detail illustrating the structure whereby a release of the push plate is effected;

FIG. 6 is a perspective detail of a portion of the switching mechanism;

FIG. 7 is a perspective detail of another portion of the switching mechanism;

FIG. 8 is a perspective detail of the forward portion of the grocery loading container, including the removable door therefor and the push plate;

FIG. 9 illustrates a typical electrical circuit;

FIG. 10 is a group perspective of the various switch control components;

FIG. 11 is a schematic perspective view of the various operating components of the machine; and FIG. 12 is a perspective detail of the control wheels and tracks for the bag carrier.

Referring now more specifically to the drawings, reference numeral 20 is used to generally designate the bagging and loading machine comprising the instant invention. This machine 20 includes a structural framework 22 particularly formed so as to position and properly support the various operating components. The structural framework 22 includes an elongated floor engaging channel-shaped base 24 with a pair of angle iron uprights 26 rising from one end thereof and braced by pedestal forming inwardly facing channel members 28 welded to both the uprights 26 and the adjacent top surface of the base beam 24 The pedestal is topped by an upwardly directed channel member 30.

Cantilevered forwardly from the two uprights 26 are a pair of elongated rigid shafts or rods 32, these shafts 32 being affixed through and supported by the uprights 26 as well as the underlying upwardly directed flanges on the channel member 30 and any additional support deemed necessary such as the intermediate vertical plate 34. These rods or shafts 32 slidably mount, through opposed downwardly directed bearing units 36, the main carriage 38. The bearing units 36 are slidably engaged with the rods 32 for movement of the carriage 38 therealong over both the flanges of the channel member 30 and any additional support plates 34 provided so as to allow for a movement of the main carriage 38 rearwardly into close proximity to the framework uprights 26 as suggested in phantom lines in FIG. 2.

The main carriage 38 includes a base 40 which mounts the bearing units 36, a pair of vertically extending rigid unrights 42 rigidly affixed to the rear portion of the base 40 in laterally spaced relation to each other, and a pair of rigid forwardly directed support arms 44 affixed to the upper end portions of the carriage uprights 42. A flat horizontally orientated panel 46 is provided between the arms 44 and mounted for slight vertical swinging by means of a transversely extending rigid shaft 48 affixed across the inner edge of the panel 46, the opposite ends of which are rotatably received through the uprights 42. The plate 46 is biased downwardly by means of an elongated coiled spring 50 engaged between the undersurface of the plate 46 and an underlying member of the base 40 with the downwardly biased movement of the plate 46 being limited by engagement of the forward end portion thereof with a transverse rod 52 fixed between the forward end portions of the arms 44.

A rigid rod 54 is fixed transversely across the forward edge of the plate 46 and projects laterally from both sides thereof for reception through a pair of projecting ears 56 projecting from the under or rear surface of a bag carrying plate 58 thereby effecting a rotational mounting of the carrier or carrying plate 58 on the forward edge of the plate 46. The ears 56 are located toward the upper edge of the plate 58 whereby, upon the release of any support for the lower or forward portion of the plate 58, the plate 58 will automatically swing downward to a substantially vertical position into abutment against a positioning member 60 projecting forwardly from one or both of the arms 44 and defining an abutment against which the vertically orientated plate 58 rests.

The lower edge of the carrier plate 58 is provided with a pair of downwardly offset forwardly directed support feet 62 laterally spaced from each other along the central portion of the plate 58. These feet 62, noting FIG. 4 in particular, receive and support the bottom of a grocery bag 64 to be loaded. Pivotally affixed to the upper edge of the plate 58 is a flat plate 66 which normally overlies the forward face of the plate 58. This plate 66 includes a pair of laterally spaced forwardly projecting angle members 68 and 70, each including a vertical flange which is received within the open end of a bag 64 and a laterally directed flange which overlies the edge of the bag. The angle member 68 is rigidly affixed to the plate 66 while the angle member 70 is pivotally secured thereto for a lateral swinging toward and away from the member 68, the pivotal engagement of the member 70 with the plate 66 being such whereby the member 70 will be retained in any pivotally adjusted position by means of friction developed within the joint. The laterally inward swinging of the member 70 facilitates a positioning of the bag 64 which, after being positioned, is seated against the front face of the plate 58 on the support feet 62 with the mouth of the bag maintained open by the members 68 and 70. The plate 66 additionally includes a pair of upwardly or rearwardly projecting flaps 78 to the opposite side of the hinged joining of the plate 66 to the upper edge of the plate 58, these flaps 78 enabling the operator of the machine to quickly pivot both bag holding members 68 and 70 upwardly out of the bag as the bag is being discharged onto a loading cart as shall be explained subsequently. Noting FIG. 1, a rearwardly projecting lug 80 is affixed either directly or indirectly, to the plate 66 and projects through a notch 82 in the upper edge portion of the plate 58 for selective engagement with a spring-loaded latch 84 for retaining the bag holding members 68 and 70 upwardly pivoted relative to the bag as the bag is being loaded into a cart.

An elongated rigid toothed bar or gear track 86 is rigidly affixed to the base 40 of the carriage 38 and projects rearwardly therefrom into overlying relation with the pedestal where it meshes with a motor driven gear 88, the motor 90 for which is mounted on the horizontal web of the upper pedestal beam 30. If necessary, the front and rear vertical flanges of the beam or beam member 30 can be centrally notched for the accommodation of the bar 86. Further, in order to maintain proper engagement of the toothed bar 86 with the drive gear 88 associated therewith, a holddown roller 92 can be mounted on the frame for rolling engagement with the upper surface of the bar 86.

An elongated horizontally orientated track 94 is rigidly affixed to the framework and projects forwardly from the uprights 26, appropriately braced, as at 96, and terminates in a downwardly curled forward end, best seen in FIG. 12. This track 94 is substantially centrally aligned with the plate 46 which in turn is provided with a depending roller 98 in alignment with and receivable on the track 94 as the main carriage 38 moves rearwardly. The roller 98, upon engaging the downwardly curled forward end of the track 94, rides up onto the track 94, pivoting the plate 46 upwardly to a horizontal position, tensioning the spring 50 which acts so as to maintain the roller 98 in positive engagement with the flat upper surface of the track 94. In conjunction with the upward swinging of the plate 46 to a horizontal position, it will be appreciated that a vertical raising of the bag carrying plate 58 will also be effected, this actual vertical movement being approximately one to two inches.

The bag carrying plate 58 is also provided with a positioning roller 100, the roller 100 projecting rearwardly from the plate 58 to one side of the roller 98 and being annularly grooved for guided travel along a vertically orientated track 102. The track 102 is fixed to one side of the track 94 and includes a roller receiving horizontal edge which terminates in a downwardly and forwardly inclined wheel-receiving edge portion 104. As the main carriage 38 moves rearwardly, the positioning roller 100 contacts the inclined edge portion 104 and travels upwardly therealong to the horizontal edge portion, at the same time swinging the bag carrying plate 58 from a vertical position to a horizontal position as suggested in FIG. 2, thus properly positioning a grocery bag 64 for positioning of the groceries therein. A grocery container or loading unit 106 is mounted on the frame or framework 22 in alignment with the rearwardly moving carriage in a manner so as to be enveloped by the carrier mounted bag 64. This loading unit 106 includes a pair of laterally spaced vertically orientated side walls 108 fixed to the upper end portions of the two frame uprights 26, and a transverse bottom panel 110 rigid with and extending between the side walls 108 for approximately half the length thereof forward from the uprights 26. A retractable bottom 112 underlies the fixed bottom 110 and extends the full length of the loading unit 106, also being orientated between the side walls 108 immediately below the fixed bottom wall 110. An elongated toothed bar or gear track 114 is affixed to the retractable bottom wall 112 and extends rearwardly therefrom for slidable reception through a frame mounted bearing unit 116 provided rearwardly of the uprights 26. A drive motor 118 for the retractable bottom is mounted below the rearwardly extending portion of the toothed bar 114 and has an associated drive gear or pinion 120 thereon which meshes with the teeth on the bar 114 for effecting a longitudinal movement thereof so as to produce the desired rearward retraction of the bottom as shall be described subsequently. The motor is mounted on a pivotally supported platform 122 which is normally swung downward so as to disengage the drive gear 120 from the bar 114. A lever unit 124 is pivoted to the frame 22 below the motor platform 122 and includes an upwardly directed portion or lug 126 which bears against the bottom of the platform 122. This unit, through an engagement with one of the frame beams or cross members 128, limits the downward pivoting of the platform 122. Further, the unit 124 mounts an abutment member 130, in the nature of a roller or the like, which is engaged by an adjustable member 132 affixed to the rearwardly moving carriage for effecting an upward pivoting of the unit 124, and consequently the motor platform 122 and motor 118 for an engagement of the gear 120 with the gear track 114.

A pair of laterally spaced elongated rigid arms 134 are rigidly affixed to the frame uprights 26 and project forwardly therefrom, outward of and slightly below the side walls 108 of the loading unit 106, these arms 134 also projecting a slight distance rearwardly of the uprights 26 for purposes of structural stability and so as to constitute a portion of the mounting structure. Each of the arms 134 mounts, along the inner extent thereof, an elongated rod 136, these rods 136 paralleling the loading unit 106 to the opposite sides thereof. A sliding collar 138 travels on each rod 136 and has an elongated rearwardly directed mounting plate 140 rigidly attached thereto. These mounting plates 140 extend rearwardly from the collars 138 parallel and slightly inward of the rods 136 and terminate in lateral inwardly directed end portions 142 which are rigidly affixed to the undersurface of the retractable bottom panel 112, thus cooperating with the toothed bar 114 in providing a support for the retracting bottom panel 112 and also acting as a means for repositioning the bottom panel 112 as shall be described subsequently. Also slidably mounted on each of the rods 36, rearward of the corresponding collar 138 is an elongated sleeve 144 which, through a flat mounting plate 146 welded to the upper surface thereof, mounts a vertically extending shaft 148. The shafts 148 are in lateral alignment with each other and mount a crossbar 150 which spans the loading unit 106 in spaced relation above the side walls 108. This crossbar 150 can be vertically adjustable through providing the opposed shafts 148 with threaded upper portions for the reception of appropriate locknuts 152 engageable with the crossbar 150 for effecting the desired vertical positioning thereof. Depending centrally from the crossbar 150 into the interior of the loading unit 106 is an appropriate mounting stem 154 which mounts and supports a vertically orientated transversely positioned pusher or pusher plate 156. This pusher plate 156 constituting in effect a longitudinally movable back wall for the loading unit 106, the plate 156, while substantially co-extensive with the interior of the loading unit 106, being out of engagement with the side and bottom walls thereof so as to freely move therealong in response to a sliding of the sleeves 144 along the rods 136. It should be appreciated that the sleeves 144 are free to slide on the rods 136 up to engagement with the collars 138, the collar mounted bars 140 being offset inwardly sufficiently so as to allow for a movement of the sleeves 144 thereby.

The forward movement of the pusher plate 156 is effected in conjunction with a forward movement of the main carriage 38 by means of a pair of releasable latches engaged therebetween. Each pusher plate mounting sleeve 144 is provided with an upwardly projecting lug 158 which is engaged by a downwardly directed lug or hooked end 160 on a spring-loaded plate 162 mounted on the corresponding upper or rear edge portion of the bag carrying plate 58, the plate 162 being biased toward the plate 58 so as to in effect resiliently retain the hooked end 160 downward into engagement over the upwardly directed sleeve lug 158. Further, the hooked end 160 on each of the plates 162 is provided with an inclined rearwardly directed face so as to automatically engage with the lug 158 upon a rearward movement of the carriage. The disengagement of the latch is effected as the main carriage 38 approaches the forward end of the machine through a downwardly directed lug 164 provided on each plate 162 which engages against and rides upwardly over a camming member 166 affixed to the forward end portion of the corresponding rod supporting arm 134. This camming lug 164 of course freely rides over the camming member 166 upon a subsequent retraction of the main carriage 38.

The retraction of the pusher plate 156 is also effected by the forward movement of the main carriage 38, such occurring upon the release of the latches which effect the initial forward movement of the pusher plate. This retraction is achieved by means of a pair of elongated cables 168, each cable having one end thereof affixed to one of the plate mounting sleeves 144 and extending rearwardly therefrom over upper and lower frame mounted pulleys 170 and then forwardly to a point of attachment 172 with the lower portion of the main carriage 38.

In the starting position, the main carriage 38 is orientated at a forward and downward inclination at the forward part of the machine, somewhat as illustrated in phantom lines immediately to the right of the full line showing of the carriage in FIG. 2. In addition, the pusher plate 156 is retracted toward the rear of the loading unit 106 and the retractable bottom 112 is fully extended. In this position, a bag is mounted on the bag carrying plate 58 and positioned in a fully expanded manner by the bag positioning arms 68 and 70. Next, groceries are loaded into the loading unit 106 between the retracted pusher plate 156 and a lowered pivotally mounted door 174 which swings across the forward end of the loading unit 106, this door 174 being hingedly mounted on one arm 134 and releasably received within an appropriate keeper 176 on the other arm 134. The groceries are positioned within the loading unit 106 up to a point no higher than the top of the side walls 108. When the groceries within the loading unit 106 are to be bagged, the start button or switch 178 is pushed. This activates the carriage motor 90 and, through the drive gear 88 and toothed bar 86, starts a rearward movement of the carriage 38. As the carriage 38 travels rearwardly, the bag carrying plate 58, through the roller 100 and associated guide rail 102, pivots horizontally and is received about the loading unit 106, encircling the side and bottom walls inward of the arms 134 and rods 136. When the main carriage 38 reaches its rearmost position with the bag telescoped over a substantial portion of the loading unit 106, several things occur substantially simultaneously. The latch hooks 160 engage with the lugs 158 on the pusher plate sleeves 144, the frame of the carriage 38, or a projecting lug thereon, engages a normally closed switch 180 which breaks the circuit to the motor 90 and stops the rearward movement of the carriage 38, the pivoted plate 122 which mounts the bottom retracting motor 118 is swung upwardly so as to engage the drive gear 120 with the toothed bar 114 associated with the retractable bottom 112, the frame of the carriage 38 engages and closes a switch 182 which completes the circuit to the motor 118, starting a retraction of the bottom 112, and finally a lug 184 on the bottom toothed bar 86 engages the toggle on a reversing switch 186 for effecting a reversal of the motor 90 upon a reactivation thereof. As the bottom 112 retracts, the groceries within the loading unit 106 fall into the loading unit enclosing bag 64. Upon a retraction of the bottom 112 approximately nine inches, a bracket 188 depending from the bottom 112 engages against a spring-loaded pivotal mount or bracket 190 which carries the normally closed switch 180 previously opened by engagement of the frame of the main carriage 38 thereagainst. This rearward pivoting of the mount 190 and switch 180 opens the switch 180 which reactivates the previously reversed motor 90. This in turn produces a forward movement of the carriage 38. The forward movement of the carriage 38 withdraws the pressure from the bottom extraction switch 182, resulting in an opening of this switch and a stopping of the bottom extracting motor 118. At the same time, the movement of the carriage 38 forwardly releases the pressure on the tilting plate which supports the motor 118, thus providing for a lowering of this motor 118 to its retracted position with the drive gear 120 out of engagement with the track associated with the bottom 112.

As the main carriage 38 continues forwardly the pusher plate is drawn along therewith by means of the engaged latches between the carriage 38 and the pusher plate sleeves 144, the pusher plate acting so as to positively discharge the groceries into the bag 64. At a predetermined point along the forward travel of the pusher plate sleeve 144, these sleeves engage against the collars 138 associated with the retractable panel 112 and effect a forward movement of these collars 138 and hence a closing movement of the bottom 112 as the bag is forwardly moved away from the loading unit 106. Upon a closing of the bottom 112, the latches engaged between the main carriage 38 and the pusher plate sleeve 144 are disengaged so as to release the pusher plate 156 for retraction. Also, the guide roller 100 associated with the carrier plate 58 follows the inclined forward edge 104 of the associated cart 102, gradually bringing the carrier plate 58 and bag 64 thereon to a vertical position. Once the bag 64 is positioned vertically and moved slightly outward, the roller 98 runs off its associated track and effects a slight vertical dropping of the carrier plate 58 and bag 64. This movement is contemplated so as to position the forwardly directed downwardly offset bag supporting feet 62 within appropriate grooves 192 defined in the surface of an appropriate cart 194 which is to receive the bags. As the feet 62 are lowered into the grooves 192, the weight of the bag 64 is transferred to the floor base of the cart and the bag shifted forwardly to a predetermined point thereon, after which the bag opening arms 68 and 70 can be quickly pivoted upwardly so as to clear the bag. As the carriage 38 reaches its forwardmost position, a laterally projecting lug 196 on the toothed bar 86, through which the movement of the carriage 34 is effected, engages the toggle switch 186, effecting a reversal of the motor 90 and an immediate rearward movement of the carriage 38. This rearward movement of the carriage 38 continues until the bag carrier panel 58 is again at the upwardly inclined starting position, at which point a spring-loaded lug or latch 198, mounted on the bar 86 between the lugs 184 and 196, engages a positioning switch 200 which stops the carriage 38 in a position ready to commence another cycle. It will be appreciated that the lug or latch 198 is spring-loaded so as to allow it to pass by the positioning switch 200 as the carriage 38 is being moved forwardly without tripping or opening the switch and breaking the circuit.

With regard to the retraction of the pusher plate 156, as previously indicated, this is effected by the cables 168 engaged between the pusher plate mounting sleeves 144 and the main carriage 38. The length of these cables 168 is such so as to result in a tensioning of the cables 168 subsequent to a release of the latches securing the pusher plate sleeves 144 to the carriage 38 whereby a continued forward movement of the carriage 38 results in a retraction of the pusher plate 156 to its retracted position, the pusher plate 156 reaching its rearmost cocation simultaneously with the main carriage 38 reaching its forwardmost location. When the carriage 38 is moving rearwardly, it will of course be appreciated that the cables 168 merely go slack and do not interfere with the aforementioned operation of the machine, only coming into play during the final forward movement of the carriage 38 subsequent to a release of the pusher plate sleeves 144. Finally, an emergency switch 202 is provided adjacent the start switch 178 for starting and stopping the machine in mid-cycle should such be necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A grocery bagging machine comprising a frame, a horizontally orientated loading unit mounted on said frame, a carriage mounted forward of the loading unit on said frame for movement rearwardly toward and forwardly away from said unit, bag mounting means on said carriage, bag positioning means for selectively moving said bag mounting means between a substantially horizontal grocery receiving position and a substantially vertical bag discharging position, said loading unit having the rear portion thereof engaged with said frame, said loading unit projecting forwardly from the engaged rear portion thereof in a suspended manner so as to enable the introduction of a carriage mounted bag thereover, said loading unit including transfer means for transferring groceries therein to a carriage carried bag.

2. The machine of claim 1 wherein said transfer means comprises a rearwardly retractable bottom and a forwardly movable pusher plate, means for rearwardly and forwardly moving said carriage on said frame, means for rearwardly retracting said bottom upon the rearward movement of said carriage a predetermined distance, and means for forwardly moving said pusher plate.

3. The machine of claim 2 wherein said means for forwardly moving said pusher plate is operative in response to forward movement of the carriage.

4. The machine of claim 3 including means for forwardly moving said bottom in response to a predetermined forward movement of said carriage.

5. The machine of claim 4 including means for rearwardly retracting said pusher plate in response to a predetermined forward movement of said carriage.

6. The machine of claim 5 wherein said bag mounting means comprises a bag receiving plate pivotally secured to said carriage for movement between a substantially horizontal position and a substantially vertical position, said bag positioning means comprising an elongated track along the path of movement of the carrier, and a roller mounted on said bag receiving plate in spaced relation to said pivot, said roller being guidably engageable with and movable along said track upon a longitudinal movement of said carriage, said track being configured to effect a vertical swinging of said bag receiving plate between the horizontal and vertical positions.

7. The machine of claim 6 wherein said bag receiving plate assumes a vertical orientation at the forward end of the machine, and means for effecting a vertical downward and upward shifting of said bag receiving plate subsequent to a vertical orientation thereof.

8. The machine of claim 7 wherein the means for effecting a vertical shifting of the bag receiving plate comprises a rigid member pivotally engaged with said carriage and pivotally mounting said bag receiving plate, said pivotally mounted rigid member forming the pivotal mount for the bag receiving plate on the carriage, a second track along the path of movement of the carriage, and a second roller mounted on said rigid member and guidably engageable with and movable along the second track upon longitudinal movement of said cariage, said second track being configured to effect a vertical shifting of said second roller, and both the rigid member and the bag receiving plate along therewith, upon the second roller initially engaging and disengaging said second track.

9. The machine of claim 8 including bag supporting feet on the lower forward end of the bag receiving plate, said feet being downwardly offset from said plate and laterally projecting in a forward direction relative thereto.

10. The machine of claim 9 in conjunction with a bag receiving cart located forwardly of said machine in the path of movement of the bag carrying plate, said cart having a base with upwardly opening elongated grooves defined therein, said bag supporting feet being receivable within said grooves upon a downward shift of said bag receiving plate whereby the weight of the bag is transferred to the base of the cart.

11. The machine of claim 6 wherein the means for forwardly moving said pusher plate comprises latch means on said carriage automatically engageable with said pusher plate upon a rearward movement of said carriage for locking said pusher plate to said carriage whereby a forward drawing of said pusher plate will be effected by the forwardly moving carriage, and means for automatically disengaging said latch means at the desired forward limit of said pusher plate.

12. The machine of claim 11 wherein the means for forwardly moving said bottom comprises a sliding abutment fixed to said bottom and positioned forward of said pusher plate in the path of forward movement thereof, said abutment being engageable by the forward moving pusher plate and movable along therewith whereby a forward movement of the bottom in conjunction with a forward movement of the pusher plate is effected.

13. The machine of claim 12 wherein the means for rearwardly retracting said pusher plate comprises a pulley mounted cable engaged at one end with said pusher plate and at the other end with said carriage, said cable being tensionable upon the forward movement of the carriage to a predetermined point with continued forward movement of the carriage effecting a retracting movement of said pusher plate through said cable.

14. The machine of claim 13 including a pair of elongated forwardly projecting rods mounted on said frame, said carriage including a base with rod engaging bearing units mounted thereon whereby a slidable mounting of said carriage is achieved, said means for rearwardly and forwardly moving said carriage comprising an elongated gear track fixed to said carriage and projecting rearwardly therefrom, a frame mounted motor driven drive gear engageable with said gear track.

15. The machine of claim 14 including a second pair of elongated forwardly projecting rods fixed to said frame, said pusher plate including a pair of sleeves slidably mounted on said second pair of rods for guided movement therealong, said second pair of rods being located laterally outward of said loading unit.

16. The machine of claim 15 wherein the means for rearwardly retracting said bottom comprises an elongated gear track fixed to said bottom, and a drive motor mounted drive gear movably mounted on said frame for selective engagement with the bottom gear track upon a predetermined rearward movement of the carriage, and means for activating said motor in conjunction with an engagement with the gear track.

17. The machine of claim 3 wherein the means for forwardly moving said pusher plate comprises latch means on said carriage automatically engageable with said pusher plate upon a rearward movement of said carriage for locking said pusher plate to said carriage whereby a forward drawing of said pusher plate will be effected by the forwardly moving carriage, and means for automatically disengaging said latch means at the desired forward limit of said pusher plate.

18. The machine of claim 4 wherein the means for forwardly moving said bottom comprises a sliding abutment fixed to said bottom and positioned forward of said pusher plate in the path of forward movement thereof, said abutment being engageable by the forward moving pusher plate and movable along therewith whereby a forward movement of the bottom in conjunction with a forward movement of the pusher plate is effected.

19. The machine of claim 2 including a pair of elongated forwardly projecting rods mounted on said frame, said carriage including a base with rod engaging bearing units mounted thereon whereby a slidable mounting of said carriage is achieved, said means for rearwardly and forwardly moving said carriage comprising an elongated gear track fixed to said carriage and projecting rearwardly therefrom, and a frame mounted motor driven drive gear engageable with said gear track.

20. The machine of claim 19 including a pair of elongated mounting rods fixed to said frame and projecting forwardly laterally outward of the opposed sides of the loading unit, said pusher plate including a pair of sleeves mounted on this second pair of rods for slidable movement therealong, said retractable bottom having a pair of collars fixed to the opposed edge portions thereof, said collars being slidable received on the second pair of rods forward of said pusher plate sleeves for selective engagement by the forwardly moving sleeves upon a forward movement of said pusher plate, thereby effecting a corresponding forward movement of the retractable bottom along with the continued forward movement of the pusher plate.

21. The machine of claim 2 wherein the means for rearwardly retracting said bottom comprises an elongated gear track fixed to said bottom, and a drive motor mounted drive gear movably mounted on said frame for selective engagement with the bottom gear track upon a predetermined rearward movement of the carriage, and means for activating said motor in conjunction with an engagement with the gear track.

22. The machine of claim 1 wherein said transfer means comprises a forwardly movable pusher plate, means for rearwardly and forwardly moving said carriage, and means for forwardly moving said pusher plate in response to a predetermined forward movement of said carriage.

23. A grocery bagging machine comprising a frame, a horizontally orientated loading unit mounted on said frame, pusher means mounted in said loading unit and movable forwardly and rearwardly therein, a retractable bottom in said loading unit movable forwardly and rearwardly therein, a bag carrying carriage mounted on said frame forwardly of said loading unit and movable forwardly and rearwardly relative to said loading unit for selectively enclosing said loading unit within a mounted horizontally orientated bag, means for effecting a rearward movement of said carriage, means for automatically terminating the rearward movement of said carriage and commencing a rearward movement of said retractable bottom, means for automatically terminating the rearward movement of the retractable bottom and commencing forward movement of the carriage, the pusher means and the bottom, means for automatically terminating the forward movement of the pusher means and retractable bottom, and means for automatically effecting a rearward movement of said pusher means in response to a continued forward movement of said carriage.

24. A grocery bagging method comprising the steps of loading groceries within a horizontally orientated loading unit, moving a horizontally oriented grocery bag about the grocery containing loading unit, discharging groceries downwardly into the bag surrounding the loading unit by retracting a bottom of the loading unit, pushing the groceries horizontally into the bag while retracting the bag from the loading unit, and vertically orientating the bag with the groceries therein.

References Cited
UNITED STATES PATENTS

| | | | |
|---|---|---|---|
| 2,850,855 | 9/1958 | Offutt | 53—35X |
| 2,966,770 | 1/1961 | Lewis | 53—255 |
| 3,052,075 | 9/1962 | Velasquez | 53—391X |
| 3,161,003 | 12/1964 | Grintz | 53—255 |

THERON E. CONDON, Primary Examiner

R. L. SPRUILL, Assistant Examiner

U.S. Cl. X.R.
53—258, 260, 390